United States Patent [19]

Eckbreth

[11] Patent Number: 4,660,932

[45] Date of Patent: Apr. 28, 1987

[54] OPTICAL SPLITTER FOR DYNAMIC RANGE ENHANCEMENT OF OPTICAL MULTICHANNEL DETECTORS

[75] Inventor: Alan C. Eckbreth, Glastonbury, Conn.

[73] Assignee: United Technologies Corporation, Hartford, Conn.

[21] Appl. No.: 630,545

[22] Filed: Jul. 13, 1984

[51] Int. Cl.[4] .............................................. G02B 27/14
[52] U.S. Cl. .................................................... 350/171
[58] Field of Search ........................................ 350/171

[56] References Cited

U.S. PATENT DOCUMENTS

| 3,403,260 | 9/1968 | Geusic et al. | 350/171 |
| 4,362,361 | 12/1982 | Campell et al. | 350/171 |
| 4,541,688 | 9/1985 | Watt et al. | 350/447 |

OTHER PUBLICATIONS

Western Electric, *Multiple Beam Generator*, by W. A. Murray, Technical Digest, No. 15, Jul. 1969, pp. 33-34.
Applied Optics, vol. 23, No. 9, May 1984, *Cars, Temperature and Species Measurements in Augmented Jet Engine Exhausts*, by Eckbreth et al., pp. 1328-1339.

Primary Examiner—John K. Corbin
Assistant Examiner—Vincent J. Lemmo
Attorney, Agent, or Firm—Eric W. Petraske

[57] ABSTRACT

An optical beam splitter divides an incoming converging optical beam into two or more spatially separated output beams that both have a desired attenuation ratio between consecutive output beams and also focus all output beams in substantially the same plane.

5 Claims, 5 Drawing Figures

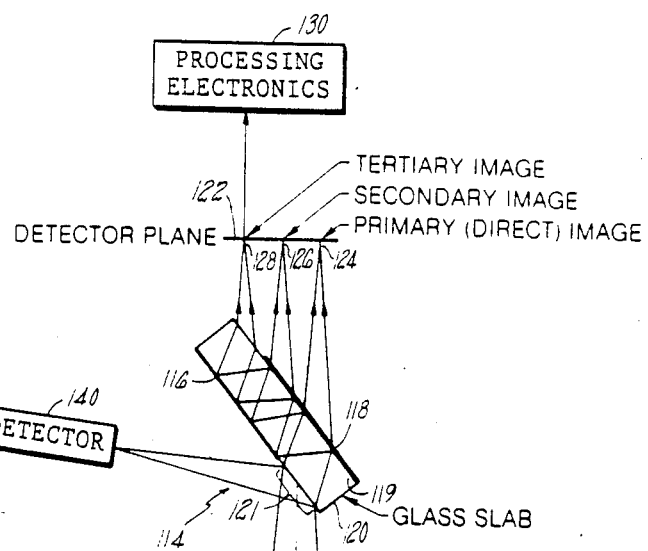
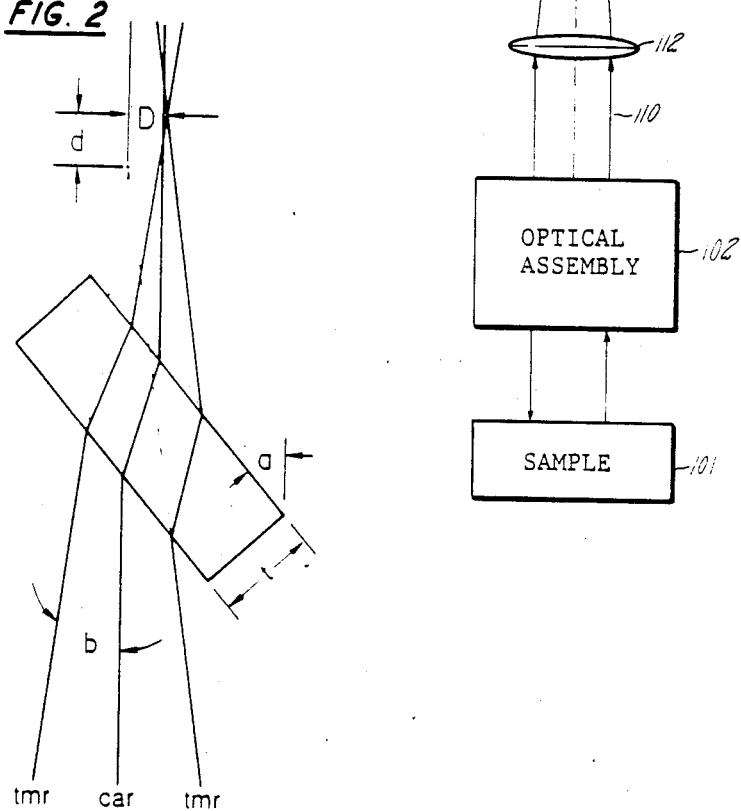

OPTICAL SPLITTER FOR DYNAMIC RANGE ENHANCEMENT OF OPTICAL MULTICHANNEL DETECTORS

TECHNICAL FIELD

The field of the invention is that of optical devices; in particular, devices in which a detector has a number of detecting elements responsive to different portions of a beam.

BACKGROUND ART

The problem addressed by this invention is that of optical detection devices in which an input beam will be divided into two or more output beams of different intensity, the intensities being selected so that when the first beam saturates the detector, the second beam will have a lower intensity that can be measured by the detector. Such an approach is necessary in samples with rapid temporal variations that cause signal levels to vary widely and randomly with time.

The use of a glass plate or wedge to derive two or more beams from an input beam is well known in the art. U.S. Pat. No. 4,362,361 entitled "Collimated Beam Manifold with the Number of Output Beams Variable in a given Output Angle", illustrates the approach using a glass plate to produce a number of parallel output beams having a specified intensity ratio. This device accepts as input a collimated beam and produces a number of collimated beams as output.

In the particular case where the optical radiation has to come to a focal point at the surface of a multichannel detector, with each channel representing a different frequency range of the radiation, the foregoing approach will not work because the several output beams must all focus on the detector surface or else the spectral response of the detector will be different for each output beam. A straightforward approach using the prior art would be to position a different focal length lens in front of each output beam to provide a focus at the right position. In the real world, however, this approach would not work because commercially available multichannel detectors are quite small.

DISCLOSURE OF THE INVENTION

The invention relates to an apparatus for generating from a converging input beam, a set of two or more converging output beams that: (a) have a specified intensity ratio; and (b) all focus on the same plane.

A feature of the invention is that the optical element consists of a single glass slab that is coated on one or both sides. Another feature of the invention is the ability to provide a specified intensity ratio between the output beams.

Another feature of the invention is the ability to use a reflection from the input beam as an intensity monitor.

BRIEF DESCRIPTION OF DRAWINGS

FIG. 1 illustrates, in partially pictorial, partially schematic form, an embodiment of the invention.

FIG. 2 illustrates a detail of the optical beam-splitter.

BEST MODE OF CARRYING OUT THE INVENTION

In FIG. 1, optical assembly 102 is a schematic representation of any sort of optical test system that produces a beam of the sort that is to be handled by this invention. In particular, assembly 102 may be a Raman, Rayleigh or other spectrometer in which a laser beam is generated and directed at a sample (box 101 in the figure) from which optical radiation returns that is meant to be analyzed for any number of purposes. For purposes of illustration, box 102 will be assumed to contain all means for generating a test or probing beam and means for transporting the resulting radiation and breaking it into its differing frequency components, which are emitted along beam 110.

Figure 5:
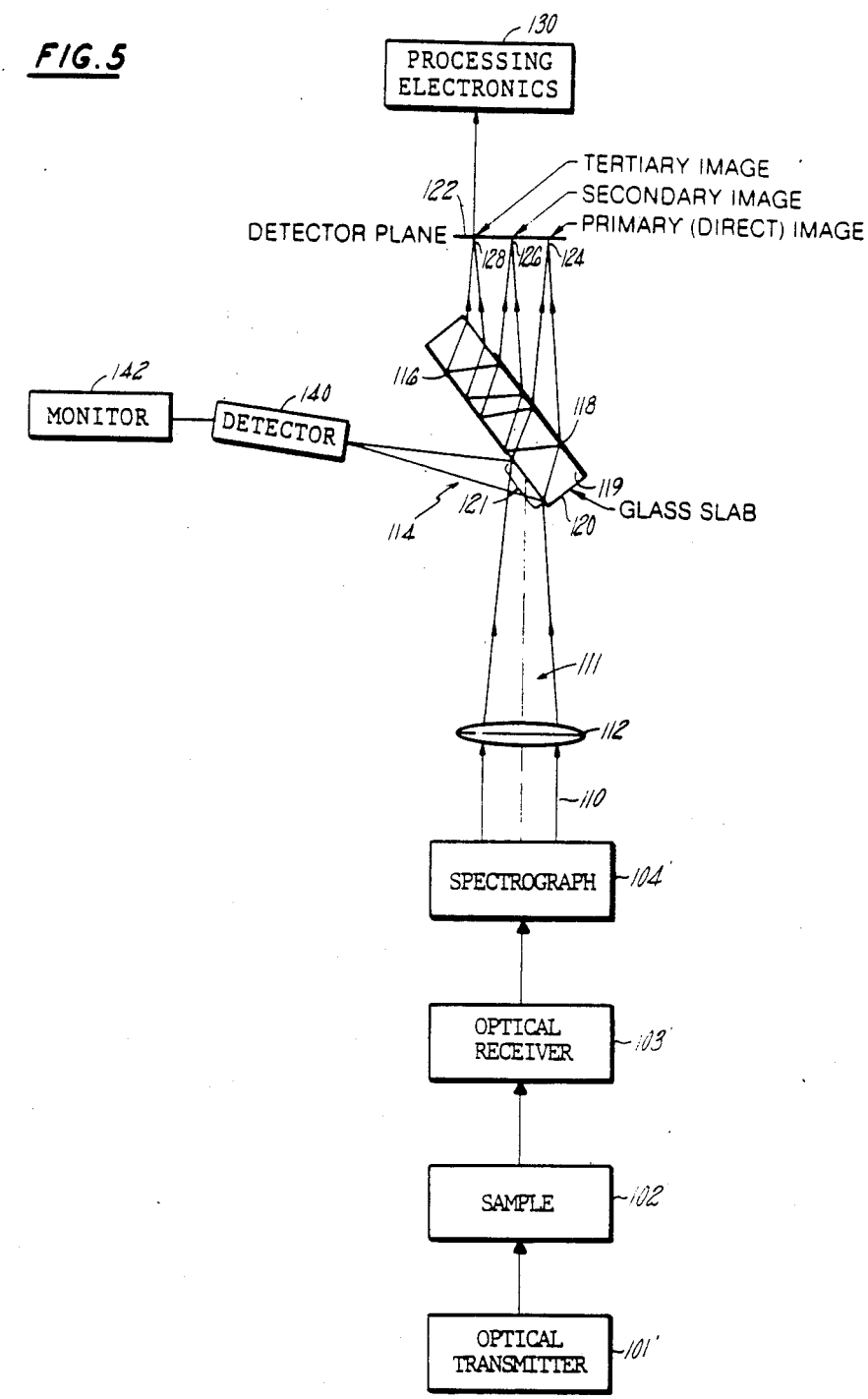
FIG. 5 illustrates an alternative system using the invention.

FIG. 5 illustrates an embodiment of the invention that employs CARS (Coherent Anti-Stokes Raman Spectroscopy), the radiation of which is emitted in the forward direction. In this embodiment, optical transmitter 101' contains two or more lasers; box 102' represents the sample; box 103' represents the optical receiver for receiving the forward-scattered CARS radiation; and box 104' represents the spectrograph, including a grating or other frequency dispersive means.

It is characteristic of Raman scattering, CARS, etc. used for combustion (as well as for many other experimental situations) that the dynamic range of the data is much greater than can be handled by commercially available multi-channel detectors. In particular in CARS, the peak spectral intensity for combusion can vary by nearly three orders of magnitude over a realistic temperature range.

With either embodiment, beam 110 is the beam directed at detector 122, a conventional multichannel detector that produces a number of pulse height signals representative of the amount of radiation striking each separate element of the detector. A typical example of a detector is the model 1215 series from Princeton Applied Research, Inc. containing an array of detector elements of dimension $25\mu$ by 2.5 mm which produces an output pulse train containing the digital information representing the magnitude of the energy directed on that particular element. The output information from detector 122 goes to processing electronics 130.

This electronics package 130 may be a general purpose digital computer or a specialized digital system. It has the initial function of testing the sets of signals from each of the three foci against a preset criterion and determining which set of signals is the strongest nonsaturated signal. That selected signal is then passed on to whatever processing or data collection system may be in use.

The details of a spectrograph or other optical device and the details of the processing electronics form no part of this invention and commercial devices are readily available to perform the function. A suitable example is shown in CARS temperature and species measurements in augmented jet engine exhausts by A. C. Eckbreth et al in Applied Optics, Vol. 23, No. 9, p 1328 (1984).

Returning now to the effect on input beam 110 of glass slab 120, note that beam 110 contains light within a predetermined frequency range, each frequency having a slightly different direction of propagation but all together having a nominal input axis of propagation indicated by phantom line 111 in the diagram, it can be seen that beam 110 enters glass slab 120 through area 121, illustratively an uncoated area of glass. The beam passes through to surface 119 of slab 120, the exit surface, which is coated by coating 118, a partially reflecting coating which is selected to let a certain fraction of the radiation pass through. The first, or primary, beam passes through the first area of coating 118 and is focused at focal point 124 on the surface of detector 122. This focus is indicated as a point in the drawing, but it will extend over a number of the detector elements of detector 122. The relative magnitude of the signals on these different elements conveys image information as to the frequency distribution of the radiation within beam 110. It can readily be seen that any deviation of the second and third foci from the primary focus will have the effect of mixing different frequency radiation onto corresponding detector elements and thus distorting the frequency spectrum of the radiation in the second and third foci. Since the function of the spectrograph is to compare the frequency of the distribution, this will evidently introduce errors in comparing the different foci. It is thus important that each of the three beams shown come to a focus in the same detector plane as nearly as possible.

That portion of the radiation in beam 110 which does not pass through coating 118 reflects back to the input surface of glass slab 120 and is reflected by totally reflecting coating 116 back toward the exit surface where a second fraction of the radiation passes through to form secondary focus 126. The remainder of that second portion of radiation repeats the same process of reflecting off coating of 116 and emerging from an uncoated portion from exit surface 119 to form a third focus 128. If surface 116 is totally reflective, then the attenuation ratio of succeeding images is 1/R, where R is the reflectivity of coating 118.

It is an advantageous feature of the invention that the radiation reflected from the input section 121 of slab 120 and denoted as beam 114 may be used to monitor the operation of assembly 102 and sample 101. The fraction of the input beam 110 that is reflected at the front surface will be constant so a detector 140 placed in intercept beam 114 will produce a signal that represents the amount of energy coming out of sample 101. A schematic representation of any electronics apparatus 142, referred to as a monitor, is used to monitor the consistency of the power in beam 114 and to make any convenient adjustments in the operation of assembly 102 to maintain a consistent signal level. For example, the monitor signal from box 142 might be used to control the alignment of the optical components in real time to counteract the effects of vibration. Alternatively, the signal might be used to modulate the power of the probing beam to compensate for dirt or soot on the optical components.

FIG. 2 shows a portion of the apparatus in more detail, with beam 110 having a central axial ray referred to as "car" and two transverse marginal rays referred to as "tmr" on either side of the central ray. These outside rays tmr represent the limits of the intensity distribution of beam 110. The boundary will not be perfectly sharp, of course, and the location of rays tmr represents a convention used in the trade, such as the half intensity point. The angle b between the car and the left hand tmr is referred to as the half-angle or half the opening between the two outer edges of the beam 110. As will be seen below, the quality of focus depends on this angle; the smaller the angle the better the focus.

The thickness of slab 120 is indicated by t and the angle between the car and the exit surface of slab 120 is indicated by a. Point 124' is the point at which beam 110 would have come to a focus if slab 120 were not there. Point 124 is the position of the best focus or the "waist" of the beam. Point 124 is located a distance d from point 124' and a distance D to one side. These distances are called the axial focal displacement and the lateral focal displacement, respectively.

It is evident that the secondary and tertiary foci will have to travel through a longer path to reach the detector plane since they are reflected backwards and then forwards. The difference between the first and second focus is called the path length difference (pld). The diagram in FIG. 2 refers to rays which are in the plane of the paper with slab 120 being located perpendicular to the plane of the paper. The effect on rays which are out of the plane of the paper will be discussed later.

In order for all three foci to be at the same detector plane, it is necessary that the path length difference between first and second and second and third foci be the same and also that the axial focal displacement of the foci also be the same. It can be shown, with some algebraic manipulation, that the axial focal displacement of the tmr is represented by:

$$d_t = \frac{t \sin a}{2}\left\{2 + \tan f\left(\frac{1}{\tan a} - \frac{1}{\tan b}\right) + \tan f'\left(\frac{1}{\tan a} + \frac{1}{\tan b}\right)\right\}$$

where $n \sin f = \cos(a-b)$ and $n \sin f' = \cos(a+b)$; a, b and t are shown in FIG. 2 and n is the refractive index of slab 120. The magnitude of the angle b is related to the f/number, f, of the spectrograph and is given by $b = \tan^{-1}(\frac{1}{2}F)$ The axial focal displacement of the secondary and tertiary images is larger than that of the primary image because of the greater distance travelled in the glass. The correct angle of slab 120 is determined by that value for which the axial focal displacement of the secondary image relative to the primary image compensates for the greater distance travelled by the secondary image to the detector. The axial focal displacement of the secondary image relative to the primary image is given by the quantity $d_t$ for the value of glass thickness equal to 2t.

The path length difference to the detector between the primary and secondary axial rays is given by $$pld = \frac{2t}{\cos g}\left(1 - \frac{\cos^2 a}{n}\right)$$

where $\sin g = (\cos a)/n$

Figure 3:
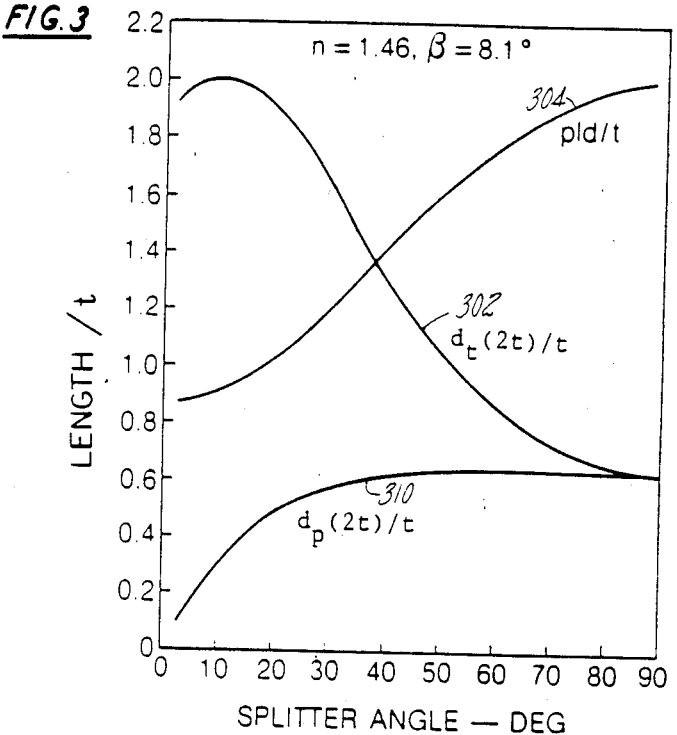
FIG. 3 illustrates a method of finding the correct working angle of the beam-splitter.

FIG. 3 plots the axial displacement of the secondary image as a function of the splitter angle and also the path length difference as a function of the same angle. Both curves are normalized by dividing by the thickness t, since they both depend linearly on the thickness. The third curve is the displacement for rays normal to the plane of the paper and will be discussed later. This particular curve was calculated with the other parameters n=1.46, b=8.1 degrees (F=3.5). As can be seen in FIG. 3, the two curves 302 and 304 cross at a value of about 38 degrees, where the axial focal displacement of the secondary image relative to the primary image compensates for the pld between the two images.

The separation, S, between the succeeding images in the detector plane is: S=2t sin a tan g for the particular case with n=1.46 and a=40.5, S=0.79t. The central axial ray can be translated to the left or right by a distance S/2 and still produce multiple images. The amount of deflection that can be tolerated will define the working range and thus the frequency spread which the device will accept. If light of greater frequency pases through beam 110, it will be deflected off onto the secondary image and give a false reading. In a particular example, the spectrograph employed a f/3.5 2000 line/mm grating ¾-m spectrograph using a 1.27-cm thick splitter, 200-cm$^{-1}$ wide spectral regions were created which is adequate for most molecular species of interest. In the same case, exit surface 119 was not coated and the attenuation ratio between the direct and secondary image was about 32.

It is evident that this device will introduce astigmatism because there is an evident asymmetry between the plane of the paper and a plane perpendicular to the paper. In the case of a plane perpendicular to the paper, the quantity $d_p$ or the axial focal displacement for rays in the perpendicular plane can be derived and shown to be $$dp = t\sin a \left( \frac{1 - \sin a \cos b}{\sqrt{n^2 - 1 + \cos^2 b \sin^2 a}} \right)$$

This quantity is also displayed as curve 310 in FIG. 3 in which it can be seen that curve 310 does not intersect the other two curves in the range near 40 degrees. This is an advantageous feature of the invention because the frequency measurement takes place in the plane of the paper and this spreading perpendicular to that plane has the effect of reducing the intensity at any particular spot on a detector element and thus reducing effect of saturation. This perpendicular spreading effect, thus, tends to extend the dynamic range of the detector array.

The lateral displacement of the central axial ray (D), the transverse marginal ray (Dt) and the perpendicular ray Dp, the outer ray in the plane perpendicular to the paper) can be computed by a procedure similar to that used above with the result:

$$D = t\sin a \left( \frac{1}{\tan a} - \tan g \right)$$

$$Dt = t\cos a[2 - \tan f(\tan a - \tan b) - \tan f(\tan a + \tan b)]$$

$$Dp = t\sin a \left( \frac{1}{\tan a} - \frac{\cos a \cos b}{\sqrt{n^2 - 1 + \cos^2 b \cos^2 a]}} \right)$$

Figure 4:
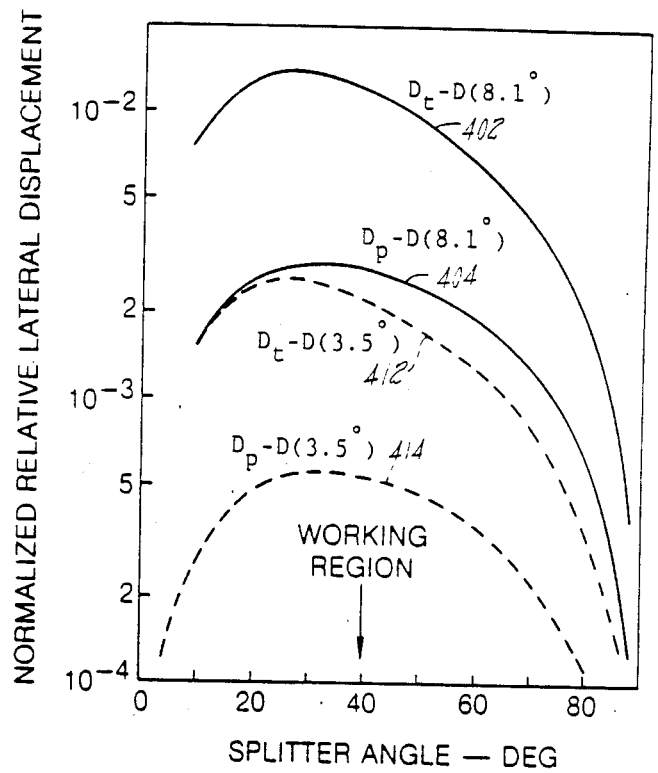
FIG. 4 illustrates the effect of a change in the input beam on the quality of the focus.

The lateral displacement of the marginal ray focus relative to the central axial ray is a measure of the aberrations which will be introduced by the splitter. The results of detailed calculations are shown in FIG. 4, comparing the deviations of the out-of plane rays with the in-plane rays from the position of the central ray in each case. Curves 402 and 404 are for b=8.1 degrees and curves 412 and 414 use for b=3.5 degrees. If the two curves for the in-plane and perpendicular rays lay on top of one another, then there would be no distortion. As can be seen, there is a small amount of distortion, which is a maximum in the region near 40 degrees where the splitter must be positioned. It is evident from the curves that the tangential aberrations, or focal smearing transverse to the detector elements, arises primarily from the tangential rays. It is evident from the two curves with a value b of 3.5 degrees and 8.1 degrees respectively that a small angle produces smaller aberrations.

Detailed ray tracing using a commercially available program, the OSLO program available from Sinclair Optics, Pittsford, N.Y. 14534, has confirmed the approximate calculations given above. For the parameters n=1.46 and b=8.1 degrees, the ray tracing has shown that the optimum splitter angle should be 40.5 degrees rather than the 38 degrees determined solely from the tangential marginal aray analysis. Ray trace scatter diagrams indicated that the lateral smearing is approximately 120 micrometers for the direct image and 370 micrometers for the secondary image. Experimental observation however, using a knife-edge scan, has shown that most of the energy (80%) is contained within a distance of 70 and 200 micrometers for the two images, respectively. For commercially available 25 micrometer detector elements, this smearing would correspond to about 3 and 8 channels respectively and an experiment on the spectrum from nitrogen in ambient air in the same spectrograph has shown that while the full width at half height of the spectrum of the direct image was seven channels, that for the secondary image was only ten channels. This indicates that the calculations were slightly pessimistic and that diffractive effects have produced a somewhat better result than that predicted by geometrical optics.

The invention may be employed in a monochromatic optical system where a signal varies in strength as well as in a spectrometer.

The invention may also be employed with a number of separate detectors, such as photomultiplier tubes or photo diodes. These separate detectors are suited to systems where the total energy in one focus is to be measured, such as monochromatic systems.

I claim:

1. An optical system including a device for splitting an input beam of optical radiation, traveling along an input axis, into at least two output beams traveling along at least two substantially parallel axes:
   a slab of material, optically transmissive in a predetermined wavelength region, disposed along said input axis, and having an entrance surface through which said input beam may enter said slab and an exit surface, through which said at least two output beams may exit said slab;
   in which said entrance surface has a first area coated with a substantially totally reflective coating and a second area adapted for the entrance of said input beam; and
   in which said exit surface is partially transmissive, whereby a first fraction of said input beam is transmitted out of said slab as a first beam of said at least two output beams and a second fraction of said input beam is reflected from said exit suface and from said substantially reflective coating, traveling through said slab as an intermediate beam a second fraction of which intermediate beam exits said exit surface as a secondary beam of said at least two output beams, after traveling a slab distance through said material; characterized in that:
   said input beam and said at least two output beams are converging;

said entrance and exit surfaces are parallel and said at least two output beams define an output plane said first fraction of said input beam converges to a first focus at a focal plane perpendicular to said input axis and perpendicular to said output plane;

said secondary beam converges to a secondary focus at a point displaced perpendicular to said focal plane by an offset distance that depends on an entrance angle between said input axis and a normal to said slab, said thickness of said slab, said index of refraction, and an input half angle characteristic of said input beam; and said slab is disposed such that said entrance angle has a predetermined value such that said offset distance is substantially zero.

2. An optical system according to claim 1, further characterized in that a multi-channel optical detector, responsive in said wavelength region, is disposed in said focal plane to intercept said at least two foci, said optical detector comprising a plurality of individual detector elements having a shorter dimension in said output plane and a longer dimension perpendicular to said output plane, whereby said individual detector elements have a response that integrates optical radiation travelling out of said output plane.

3. An optical system according to claim 1, further including a multi-channel optical detector disposed in said focal plane to intercept said at least two foci and electronic means connected to said detector, in which said electronic means compares detector signals from the vicinity of said at least two foci and selects that group of signals that is the strongest and is also below a predetermined saturation limit, whereby said system adapts in real time to variation in signal strength by selecting the strongest usable signal.

4. An optical system according to claim 1, further characterized in that an optical detector is placed to intercept each of said at least two foci, whereby each of said detectors responds to the radiation in one of said output beams.

5. An optical system according to claim 4, further including electronic means connected to said optical detectors, which electronic means compares detector signals representative of said at least two beams and selects the strongest of said detector signals that is below a predetermined saturation limit, whereby said system adapts in real time to variation in signal strength by selecting the strongest usable signal.

* * * * *